United States Patent
Elfving et al.

(10) Patent No.: US 6,226,565 B1
(45) Date of Patent: May 1, 2001

(54) METHOD FOR CONTROL OF AN INDUSTRIAL ROBOT ALONG A GIVEN TRACK

(75) Inventors: Staffan Elfving, Västerås; John-Erik Snell, Kolbäck, both of (SE)

(73) Assignee: Asea Brown Boveri AB, Vasteras (SE)

( * ) Notice: Subject to any disclaimer, the term of this patent is extended or adjusted under 35 U.S.C. 154(b) by 0 days.

(21) Appl. No.: 09/101,532

(22) PCT Filed: Jan. 15, 1997

(86) PCT No.: PCT/SE97/00059

§ 371 Date: Jul. 10, 1998

§ 102(e) Date: Jul. 10, 1998

(87) PCT Pub. No.: WO97/29890

PCT Pub. Date: Aug. 21, 1997

(30) Foreign Application Priority Data

Feb. 14, 1996 (SE) .................................................. 9600527

(51) Int. Cl.[7] .................................................. G05B 19/04
(52) U.S. Cl. .................. 700/254; 700/261; 700/250; 700/264; 900/3; 900/9; 900/15
(58) Field of Search ...................... 700/254, 261, 700/250, 264; 900/3, 9, 15; 364/513, 191–3; 318/568

(56) References Cited

U.S. PATENT DOCUMENTS

| | | | |
|---|---|---|---|
| 4,819,184 | * | 4/1989 | Jonsson et al. .................... 395/96 |
| 5,325,467 | * | 6/1994 | Torii et al. ........................ 395/96 |
| 5,528,116 | * | 6/1996 | Snell .............................. 318/568.13 |
| 5,590,034 | * | 12/1996 | Snell .............................. 364/167.01 |
| 5,708,342 | * | 1/1998 | Nihei et al. ...................... 318/568.18 |
| 5,751,130 | * | 5/1998 | Hara et al. ............................ 318/575 |

* cited by examiner

Primary Examiner—Ayaz Sheikh
Assistant Examiner—Firmin Backer
(74) Attorney, Agent, or Firm—Connolly Bove Lodge & Hutz LLP

(57) ABSTRACT

A method for control of the movement of the movement of an industrial robot along a given track ($P_1$–$P_4$) with a desired track speed (v), which industrial robot has a number of movement axes and for each axis servo equipment for control of the axis movement in accordance with reference values ($\bar{\tau}_{korr}$) supplied thereto. First, those axis angles ($\bar{\phi}_i$) which are needed for assuming the next position on the track are calculated. In dependence on the calculated axis angles and a first mathematical model, which describes the static and dynamic properties of the robot, for each one of the movement axes that torque ($\bar{\tau}=(\tau_1, \tau_2 \ldots \tau_6)$) is calculated which is required for assuming the next position. The load (t) is calculated at one or more mechanically critical points for the calculated axis angles ($\bar{\phi}_i$) with the aid of a second mathematical model, which describes the load of the robot at the critical points. For each one of the axes, the calculated torque ($\tau$) is compared with a maximum permissible torque, ($\tau_{max}$), and the load (t) is compared with a maximum permissible load ($t_{max}$) for the critical point. If the calculated torque exceeds the maximum permissible torque for any axis, or if the calculated load exceeds the maximum permissible load for any critical point, then the track speed (v) is reduced and the reference values for the servo system $\bar{\tau}_{korr}=(\tau_{korr1}, \tau_{korr2} \ldots \tau_{korr6})$, are calculated in dependence on the reduced track speed.

3 Claims, 2 Drawing Sheets

METHOD FOR CONTROL OF AN INDUSTRIAL ROBOT ALONG A GIVEN TRACK

TECHNICAL FIELD

The invention relates to a method for control of the movement of an industrial robot along a given track. The industrial robot has a plurality of movement axes (1–6). Each axis has servo equipment for control of the axis movement in accordance with reference values supplied thereto.

BACKGROUND ART

The invention relates to an industrial robot which has a plurality of movement axes, typically six axes. Such a robot has a stand which is rotatably arranged on a foot and which supports a first robot arm which is rotatable in relation to the stand. In the outer end of this arm, and rotatable in relation thereto, a second robot arm is arranged. In the following, the first arm is referred to as the lower arm and the second arm as the upper arm. At its outer end the upper arm supports a hand which is provided with a tool attachment and which is rotatable in two or three degrees of freedom relative to the upper arm. The robot is provided with servo equipment for control of the position and the orientation of the robot hand. For each one of the movement axes of the robot, servo equipment comprising a driving motor and a position sensor is provided, the latter delivering a signal which is a measure of the angle of rotation of the axis in question. The servo system of each axis is supplied with a reference value for the angle of rotation of the axis, and the driving motor of the axis brings the robot to move in the axis in question until the axis position indicated by the position sensor of the axis coincides with the reference value supplied to the servo system.

An industrial robot can be ordered to follow, at a certain speed, a track which is given in the form of a number of points in a Cartesian system of coordinates. For the robot to follow the given track, the axis angles required therefor must be calculated. For this purpose, the track is stepped with a length of step which is based on the given speed and an internal sampling time. For each step, the next position which the robot is to assume is first calculated in Cartesian coordinates. Then, the axis angles required for the robot to assume this position are calculated.

With the aid of a mathematical model for the robot, the axis torque required for driving the axes in accordance with the calculated axis angles can be calculated. A check is made whether any of the calculated axis torques exceeds the motor torques which the respective motor is capable of generating. If the available motor torque is not sufficient for carrying out the movement, the movement is adjusted, for example by reducing the speed and the acceleration, such that the available motor torque of each axis is utilized optimally while at the same time the robot still follows the track.

To prevent the mechanical structure of the robot from being overloaded, the mechanical structure must be designed such that, from the strength point of view, it endures loads caused by all conceivable combinations of individual axis movements. This requires designing the structure for a worst case which perhaps seldom occurs. This leads to the robot becoming unnecessarily slow for typical movements and causes the maximum permissible speed and load of the robot to be set unnecessarily low in order not to overload the structure. It is primarily some critical components which, for certain movements, are subjected to high loads and hence must be dimensioned for these loads.

SUMMARY OF THE INVENTION

The object of the invention is to suggest a method for control of an industrial robot along a track, which provides a possibility of reducing the dimensions of the mechanically critical parts compared with prior art robots.

According to the invention, while at the same time as the available motor torque is utilized to a maximum, mechanically critical components are to be monitored such that maximally allowed loads in the components are not exceeded. If the maximally allowed loads risk being exceeded, the movement along the track is to be modified such that the allowed loads are not exceeded.

The advantages of the invention include that it provides a possibility of dimensioning critical components more aggressively without risking mechanical overload. This gives great cost advantages. For example, a smaller wrist gives lower weight of the whole upper arm, which is of great importance for the dimensioning of the rest of the robot.

The necessary reductions of the motor torque need only occur in certain extreme combinations of axis angles. The other axis angles utilize the available motor torque in full. In this way, the robot may be designed so as to manage carrying out typical movements with a high performance. Other movements which occur more seldom are carried out with reduced motor torque so as not to exceed the critical components of the robot.

The invention also makes it possible to use loads which are larger than what is currently allowed for the robot, since there is no risk of overloading in the critical components.

DESCRIPTION OF THE PREFERRED EMBODIMENTS

Figure 1:
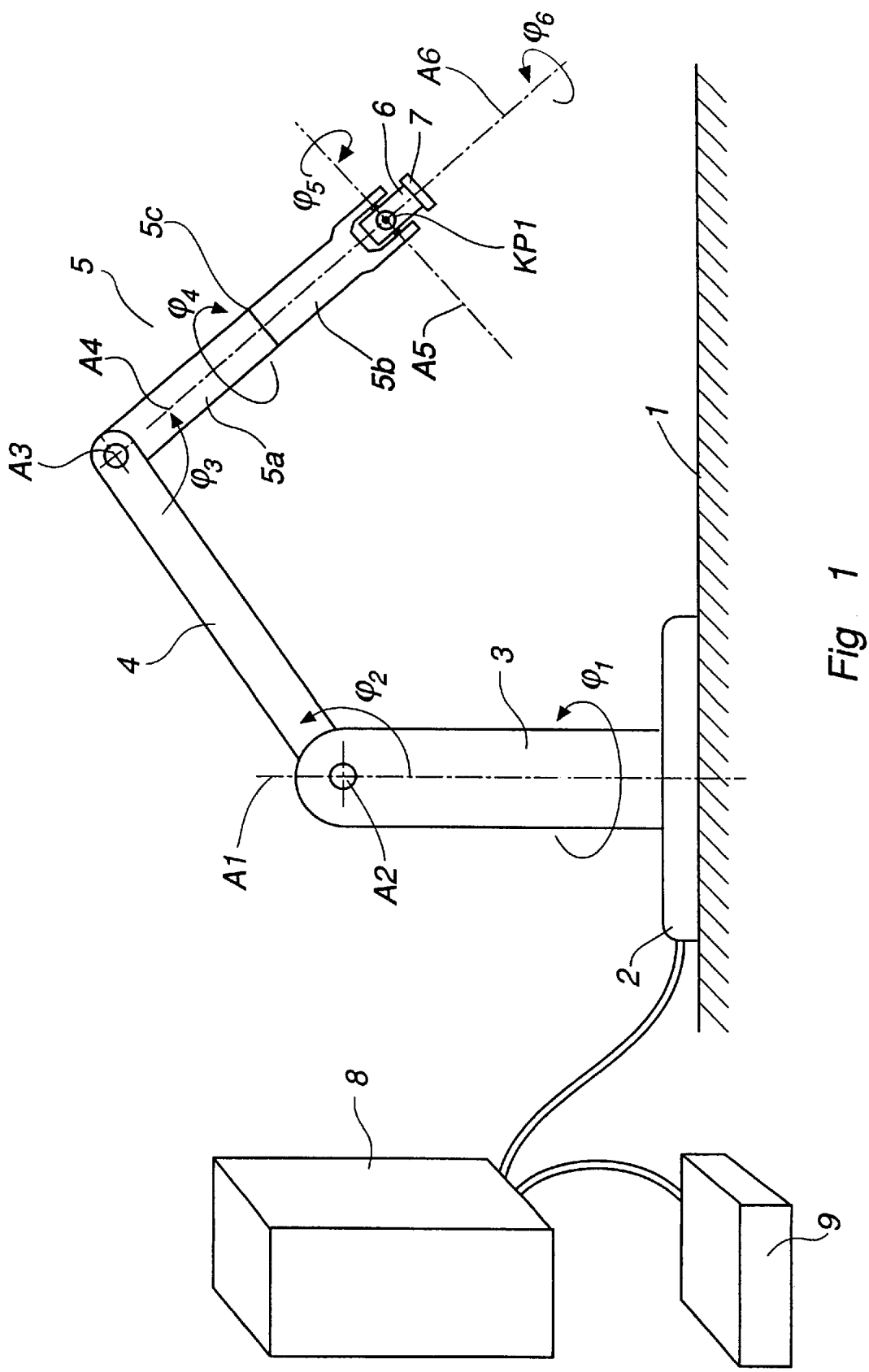
FIG. 1 shows an example of a known industrial robot, to which the invention may be applied.

FIG. 1 shows an example of a known industrial robot. The robot foot 2 is fixedly mounted on a base 1. The robot has a base stand 3 which is rotatable in relation to the foot 2 around a vertical axis A1. At the upper end of the base stand, a lower arm 4 is journalled and rotable in relation to the base stand around a second axis A2. At the outer end of the lower arm, an upper arm 5 is journalled and rotatable in relation to the lower arm around an axis A3. The upper arm 5 comprises two parts 5a and 5b, the outer part 5b being rotatable in relation to the inner part 5a around an axis of rotation A4 coinciding with the longitudinal axis of the upper arm. At its outer end the upper arm 5 supports a robot hand 6, which is rotatable around an axis of rotation A5 perpendicular to the longitudinal axis of the upper arm. The robot hand comprises a tool attachment 7. The tool attachment 7 is rotatable in relation to the inner part of the robot hand around an axis of rotation A6 which is perpendicular to A5. The angles of rotation in the six axes of rotation A1 . . . A6 are designated $\phi_1$–$\phi_6$ in the figure.

The control system is arranged in a separate control cabinet 8 and comprises, in a known manner, computer equipment with the necessary memories for programs and other data, drives for the driving motors of the different robot axes and the necessary supply equipment. The control cabinet is connected to a programming unit 9 for programming and other operation of the robot.

The robot has a number of components which are critical from a mechanical point of view. Examples of such a critical component is the suspension of the robot hand 6 in the upper arm 5. It is particularly sensitive if it is subjected to a torque around an axis perpendicular to the axes of rotation A5 and A6. A critical component normally has some critical point at which the load may become very high for certain movements. The critical points may, for example, be non-rotating points which are subjected to a torque perpendicular to the axes of rotation of the robot. For the suspension of the robot hand, the critical point is KP1.

Figure 2:
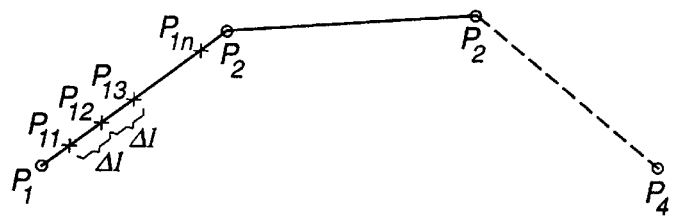
FIG. 2 shows an example of a robot track.

FIG. 2 shows an example of a track which is given in the form of a number of points $P_1$–$P_4$ in a Cartesian system of coordinates. The robot is programmed to move along the track with a given track speed v. For the robot to follow the given track in the desired manner, the torque which the driving motor of each axis is to provide must be calculated. When carrying out this calculation, a plurality of sampling points $P_{11}, P_{12}, P_{13} \ldots P_{1n}$ are introduced between the given points $P_1$–$P_4$. The distance between the sampling points is $\Delta 1$ and is based on the given track speed v and an internal sampling time $\Delta t$.

$$\Delta 1 = v^* \Delta t \tag{1}$$

Before the robot can be moved to the next sampling point, the position of the point is first calculated in Cartesian coordinates. Then, the Cartesian position is converted into axis angles $\bar{\phi}_i$ according to some known method. Starting from the calculated axis angles, the axis angles at the preceding sampling points $\bar{\phi}_{i-1}$ and $\bar{\phi}_{i-2}$ which are known, and the given track speed v, the speeds $\dot{\bar{\phi}}_i$ and the accelerations $\ddot{\bar{\phi}}_i$ for each axis, which are required for performing the ordered movement, are also calculated. The Cartesian track thus corresponds to six tracks for each axis.

With the aid of a mathematical model of the robot dynamics, that axis torque $\bar{\tau} = (\tau_1, \tau_2 \ldots \tau_6)$ which is required for driving the axes to the next position may be calculated. The axis torque $\bar{\tau}$ is derived from such dynamic effects as mass inertia, friction, centrifugal force, and gravitation.

$$\bar{\tau} = M(\bar{\phi}) \cdot \ddot{\bar{\phi}} + V(\bar{\phi}, \dot{\bar{\phi}}) \cdot \dot{\bar{\phi}} + G(\bar{\phi}) + F(\bar{\phi}, \dot{\bar{\phi}}) \tag{2}$$

$\bar{\phi} = \phi_1, \phi_2 \ldots \phi_6$ = position of the robot
$\dot{\bar{\phi}} = \dot{\phi}_1, \dot{\phi}_2 \ldots \dot{\phi}_6$ = speed of the robot
$\ddot{\bar{\phi}} = \ddot{\phi}_1, \ddot{\phi}_2 \ldots \ddot{\phi}_6$ = acceleration of the robot $M(\bar{\phi})$ is a mass matrix which describes the coupled moment of inertia for each axis. $V(\bar{\phi}, \dot{\bar{\phi}})$ are speed-dependent moments of inertia for each axis and are derived from centrifugal forces and coriolis forces. $G(\phi)$ describes the effect of the gravitation on the axis torque. $F(\bar{\phi}, \dot{\bar{\phi}})$ are frictional torques for each axis. If the position, speed and acceleration of the robot are known, the necessary axis torques may be calculated from equation 2.

Figure 3:
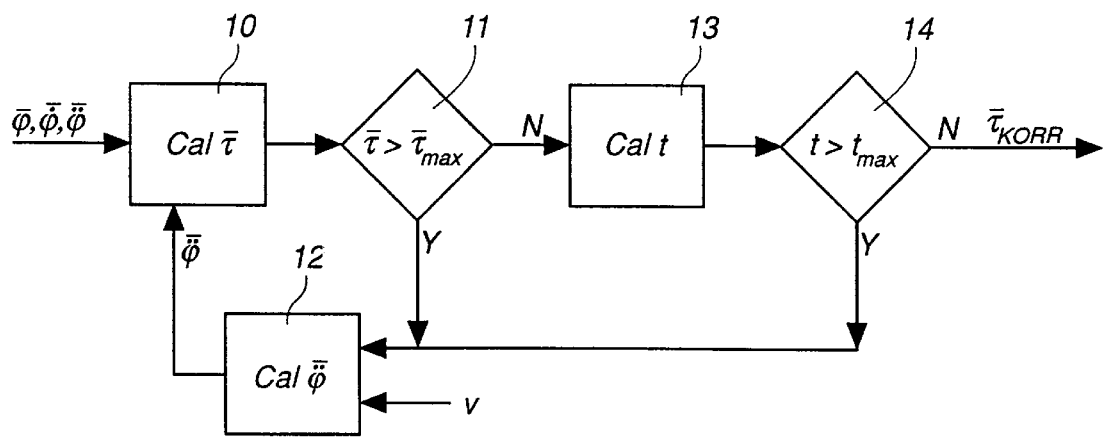
FIG. 3 shows the calculation procedure and the data flow in a method according to the invention.

FIG. 3 shows in the form of a block diagram a procedure according to the invention. In block 10 the axis torque $\bar{\tau} = (\tau_1, \tau_2 \ldots \tau_6)$ is calculated which is required for the robot to assume the next position on the track. In block 11 it is checked whether the calculated axis torques exceed the maximum motor torques $\bar{\tau}_{max}$ which can be generated by the respective motor. If any axis torque is greater than what can be maximally generated, the track speed v must be reduced. A reduction of the track speed v entails a reduction of the distance to the next sampling point $\Delta 1$. To reduce the track speed v, the acceleration $\ddot{\phi}$ for that axis where the available motor torque is not sufficient is reduced. The acceleration is reduced to such an extent that the motor manages to generate the necessary motor torque. The acceleration for the other axes is limited to a corresponding extent such that the robot still follows the track, block 12.

According to the invention, the monitoring of the torque described above is supplemented with a monitoring of the load at one or more critical points. For this purpose, at least one critical point on the robot is selected for monitoring. For each one of the critical points, a scalar equation corresponding to the load at the point is set. In this embodiment, a torque component t at point KP1 on the suspension of the robot hand is monitored. The torque component t may be described by the following equation:

$$t = m(\bar{\phi}) \ddot{\bar{\phi}} + v(\bar{\phi}, \dot{\bar{\phi}}) \dot{\bar{\phi}} + g(\bar{\phi}) \tag{3}$$

m,v,g are the scalar correspondences for the torque component t to M,V,G

In block 13 the torque component t at the suspension of the robot is calculated for the calculated axis angles $\bar{\phi}$, the speeds $\dot{\bar{\phi}}$ and the accelerations $\ddot{\bar{\phi}}$. Thereafter, the calculated torque component t is compared with a maximally allowed torque component $t_{max}$ for the critical point, block 14. If the torque component t exceeds the maximally allowed one, the track speed must be reduced and, in similar manner as described above, block 12, the acceleration for the axes is reduced such that the robot still follows the track. New axis torques $\bar{\tau}$ are calculated for the new lower track speed, block 10. The procedure is repeated until the load at the critical point no longer exceeds the maximum permissible load. The output signals from the monitoring are a motor torque $\bar{\tau} = (\tau_{korr1}, \tau_{korr2} \ldots \tau_{korr6})$ which is optimized with respect to what the motor of each axis is capable of yielding and which drives the robot to the next sampling point on the track without the load at the suspension of the robot hand becoming too high.

In another embodiment of the invention, more critical points can be monitored. For each one of the critical points, an equation is set which describes the load at the point and a maximally allowed load for the point.

What is claimed is:

1. A method for control of movement of an industrial robot along a given track with a desired track speed (v), said industrial robot having a number of movement axes and having, for each axis, servo equipment for control of axis movement in accordance with references values ($\bar{\tau}_{korr}$) supplied thereto, comprising the following steps:

calculating necessary axis angles ($\bar{\phi}_i$) for assuming a next position on the track, calculating, in dependence on the calculated axis angles and a first mathematical model, which describes static and dynamic properties of the robot, for each one of the movement axis a required torque ($\bar{\tau} = (\tau_1, \tau_2 \ldots \tau_6)$) for assuming the next position, comparing the calculated torque ($\phi$) for each one of the axes with a maximum permissible torque ($\bar{\tau}_{max}$), wherein said method further comprises the steps of:

calculating a load (t) at a mechanically critical point for the calculated axis angles ($\bar{\phi}_i$) with the aid of a second mathematical model, which describes a load of the robot at a critical point, comparing the load (t) with a maximum permissible load ($t_{max}$) for the critical point, and reducing a track speed (v) if the calculated torque exceeds the maximum permissible torque for any axis, or if the calculated load exceeds the maximum permissible load for the critical point.

2. A method according to claim 1, wherein with the aid of mathematical models, a load ($t_j$) at a plurality of mechanically critical points for the calculated axis angles ($\bar{\phi}_i$) is calculated, the load ($t_j$) is compared for each one of the critical points with a maximum permissible load ($t_{jmax}$) and, if at any point the load exceeds the maximum permissible load, then the track speed (v) is reduced such that the load does not exceed the maximum permissible load for any of the critical points.

3. A method according to claim 1, wherein reference values for the servo system $\bar{\tau}_{korr}=(\tau_{korr1}, \tau_{korr2} \ldots \tau_{korr6})$ are calculated in dependence on the reduced track speed.

* * * * *